United States Patent Office 2,800,465
Patented July 23, 1957

2,800,465

2-STAGE MANUFACTURE OF COPOLYMERS

Joseph F. Nelson, Westfield, Robert F. Leary, Cranford, and Lester Marshall Welch, Madison, N. J., assignors to Esso Research and Engineering Company, a corporation of Delaware No Drawing. Application December 29, 1953, Serial No. 401,072

10 Claims. (Cl. 260—88.1)

This invention relates to a new and improved continuous process of manufacturing high molecular weight copolymers by low temperature Friedel-Crafts polymerization.

A representative type of copolymer to which the invention may be applied is one made by copolymerizing about 60% by weight of styrene and 40% of isobutylene at a temperature of about −80 to −105° C. (corresponding to −112 to −157° F.), in the presence of methyl chloride as diluent and solvent and in the presence of a catalyst consisting of a solution of aluminum chloride in methyl chloride.

U. S. Patent 2,274,749 gives a general description of low temperature Friedel-Crafts copolymerization of styrene and isobutylene, or equivalent materials, broadly at any temperature below 0° C. and with proportions of monomers ranging very broadly from about 5 to 95% of either constituent.

However, for the purposes of the present invention, it is desired to use only polymerization temperatures below −50° C., preferably below −80° C., in order to obtain tough flexible copolymers having the desired high molecular weight, as indicated by an average intrinsic viscosity greater than 0.5, such as from 0.6 to 3.0, or preferably greater than 0.7.

For the present invention, it is also desirable to use only proportions of polymerization monomers which will produce a final copolymer having an average of 35 to 70%, preferably 45 to 65%, by weight, of combined styrene, with the balance isobutylene.

Instead of isobutylene, other aliphatic olefins may be used, preferably having more than two carbon atoms, such as propylene, normal butylenes, etc., and preferably isoolefins having 4 to 8 carbon atoms, such as isopentene (methyl-2-butene-1) or a pentene obtained by dehydration of secondary amyl alcohol.

Instead of styrene, one may use other polymerizable mono-olefinic compounds containing a cyclic nucleus, these materials preferably being vinyl aromatic compounds, and more preferably hydrocarbons. Examples of some of these materials are: alpha-methyl styrene, para-methyl styrene, alpha-methyl para-methyl styrene, para-chlor styrene, dichlor styrenes, indene, para-ethyl styrene, alpha-vinyl naphthalene, etc.

The copolymerization is effected by mixing the two reactants, with or without an inert diluent or solvent, if necessary, such as ethylene, propane, butane, methyl chloride, ethyl chloride, methylene chloride, refined naphtha, etc., and then after cooling the reactants to the desired low temperature, adding an active halide catalyst such as boron fluoride, or activated boron fluoride catalyst (about 0.2 wt. percent ether based on the boron fluoride), aluminum chloride, titanium tetrachloride, aluminum alkoxide-aluminum chloride complex $$(AlCl_3.Al(OC_2H_5)_3)$$

aluminum bromide, and the like. It is preferable to dissolve the catalyst in a solvent such as a lower alkyl halide, e. g. methyl chloride or ethyl chloride, or carbon disulfide, a low molecular weight sulfur-free saturated hydrocarbon when solubilities allow, or a mixture of methyl chloride with butane, and then the catalyst solution is preferably though not necessarily cooled down, filtered, if desired or necessary, and added to the reaction mixture. Alternative catalysts include:

$AlCl_3.AlCl_2OH$
$AlBr_3.AlBr_2OH$
$AlBr_2Cl.AlOCl$
$AlBrCl_2.AlOBr$
$TiCl_4.AlCl_2OH$
$TiOCl_2.TiCl_4$
$AlBr_3.Br_2.CS_2$

BF$_3$ isopropyl alcohol, BF$_3$ solution in ethylene, activated BF$_3$ catalyst in methyl chloride solution. Volatile solvents or diluents, e. g. ethane, ethylene, methyl chloride, carbon dioxide (liquid or solid), etc. may also serve as internal or external refrigerant to carry off the liberated heat of polymerization. Propane can be used as refrigerant if vacuum is used to remove it.

After completion of the copolymerization, residual catalyst may be inactivated with water or alcohol, for example, isopropyl, and the catalyst is subjected to removal by washing the product with water or also with dilute aqueous caustic soda. The resulting solid copolymer is a tough, thermoplastic resinous solid.

Styrene-isobutylene copolymers having, for instance, a combined styrene content of about 50 to 60% by weight and having an intrinsic viscosity of 0.6 to 1.0 or more, and having a suitable combination of high tensile strength, e. g. 1000 to 2000 lbs./sq.in. or higher, and tough thermoplastic characteristics which permit them to be sheeted out into thin, self-supporting films, or extruded, molded or otherwise shaped, have been successfully made by the above-described polymerization process, using batch operation where the reactants are placed in a reactor with diluent and enough catalyst added, and permitting reaction to continue to 100% conversion, e. g. complete reaction of the polymerizable materials.

However, difficulties have attended efforts to make such copolymers by a continuous polymerization process. For instance, if enough catalyst is used to drive the polymerization to 100% conversion, the resulting copolymer, for instance, having 60% combined styrene, has an excessively low intrinsic viscosity, e. g. about 0.25 to 0.30, even though the polymerization was effected at a relatively low temperature, e. g. −130° F. On the other hand, if a continuous polymerization process is carried out in a single stage, with less catalyst and shorter time in the reactor so as to stop the reaction short of completion, the resulting copolymer, for similar percentage of styrene in the polymerization feed, and similar temperature, will have materially higher intrinsic viscosity, e. g. about 0.5 for 80% conversion, about 0.75 for 50% conversion, or about 0.95 for 30% conversion, but all of such partial conversion operations involve the commercial disadvantage of recovering, purifying and recycling unpolymerized raw materials, and there are a number of other disadvantages.

On the other hand, batch polymerization can readily be made to give a fairly high intrinsic viscosity, e. g. about 0.95, and good hardness with 100% conversion, but batch polymerization is attended with other disadvantages, such as the necessity of frequent charging and discharging of reactors, and the difficulty of avoiding excessive leakage and loss of methyl chloride or other volatile solvents used, and numerous other disadvantages from a practical operating point of view.

A substantial improvement in continuous manufacture of such copolymers was attained by using a multiple-stage continuous operation in which the polymerization reactants, diluent and catalyst are continuously mixed together in a first reactor until partial conversion of about 30 to 70% is obtained, and then the reaction mixture containing polymer and unreacted raw materials is then passed continuously, either by overflow, pumping or by other suitable means into one or more additional reactors. For instance, in a three-stage process, the second stage would be run to a total conversion of about 60 to 90% and in the third stage, the conversion should be as high as possible, e. g. 97 to 100%. Throughout this specification, the conversion in any stage of a multiple stage operation is expressed as percent based on total feed monomers.

Catalyst is added to each of the several reactors in such a way, i. e. at such a rate as to effect the desired partial conversion in the first reactor, and then complete or essentially complete conversion in the third reactor.

However, the final product of such a 3-stage continuous process, although having a satisfactorily high intrinsic viscosity, also is softer than desired as is evident from a lower Williams plasticity at 60° C. than is obtained with a product of similar combined styrene content but made by a batch polymerization. For instance, a styrene-isobutylene copolymer of 60% average combined styrene made by the 3-stage continuous operation has a Williams plasticity (at 60° C.) in the range of 290 to 360, whereas 375 or higher is desired, and can be obtained in batch operation.

An attempt has been made to improve the above-described 3-stage process by adding styrene to the last stage, or by leaving part of the styrene out of the first stage and adding it to the last stage, but this was not successful in obtaining the desired increase in the Williams plasticity. Also, some of the isobutylene has been left out of the first stage and added to the third stage, but this likewise did not give the desired increase in Williams plasticity.

According to application Serial No. 202,424, filed December 22, 1950, now Patent 2,666,046, of which the present application is a continuation-in-part, when using a 3-stage continuous process, a considerable excess of styrene is either added in the second stage and correspondingly withheld from the first stage or in effect extra styrene is added in the first stage by withholding isobutylene from that stage and adding the extra isobutylene in the second stage. Thus, to make a final copolymer having an average combined styrene content of 40 to 70%, preferably 50 to 65% by weight, a copolymer having an average of 35 to 75%, preferably 40–65%, of the desired final average percent of combined styrene should be produced in one but only one of the first two stages, and a copolymer having an average of about 115–135%, preferably about 120–130%, of the desired final average percent of combined styrene should be produced in the other one of the first two stages, and then in the third stage, which is preferably used, a copolymer is made having an average of about 90–140% of the desired final average percent of styrene.

In carrying out this improved 3-stage continuous process, the amount of incremental conversion of monomers to polymer in the several stages should generally be about 30 to 55% by weight, preferably 35 to 50%, in the first stage, about 15–55%, preferably 25–45% in the second stage, and about 5–35%, preferably 10 to 30% by weight in the last stage. On a cumulative basis, these figures correspond to about 30–55%, preferably 35–50% in the first stage, about 65–95%, preferably 70–90% in the second stage, and about 95–100%, preferably 98–100% in the last, i. e. third stage. These conversions are based on total feed monomers.

When this 3-stage process is applied specifically to the preparation of a copolymer having a final average combined styrene content of about 60% by weight, and the modification of the invention is used in which excess styrene is injected in the second stage and is correspondingly withheld from the first stage, the actual copolymers produced in the several stages should contain about 20 to 40% of combined styrene in the first stage, about 70–80% combined styrene in the second stage, and 80 to 85% combined styrene in the third stage. On the other hand, if the modification of the invention is to be used in which extra isobutylene is injected in the second stage and is correspondingly withheld from the first stage (this method having substantially the same effect as withholding styrene from the second stage and injecting excess styrene in the first stage), then the copolymers actually produced in the three separate stages should have a combined styrene content of about 70 to 80% in the first stage, about 20 to 40% combined styrene in the second stage, and about 55–75% combined styrene in the third stage.

Since the polymerization temperature, the concentration of reacting polymers and diluent, and the catalyst concentration, and perhaps other minor factors, all have a slight effect on the relative rates at which the styrene and isobutylene copolymerize, it is better to regulate the process of the invention according to the composition of the copolymers being obtained in the several stages, and making whatever adjustment is necessary in the relative proportions of styrene and isobutylene in the feed to obtain copolymers of the desired composition in the several stages.

When using the modification of the invention in which extra styrene is injected in the second stage and is withheld from the first stage, which is the preferred modification of the invention, and where, as stated before, it is intended to produce in the first stage a styrene-isobutylene copolymer having 35 to 75% of the desired final average percent of combined styrene, and to produce in the second stage a copolymer having 115–135% of the desired final average percent of combined styrene, then the proportions of styrene feed actually fed into the first stage should be about 50 to 90%, preferably about 60 to 85%, of the desired final average percent by weight of combined styrene in the finished product. Specifically, in case it is desired to make a copolymer having a final average combined styrene content of about 60% by weight, then the proportions of styrene feed actually fed into the first stage should be about 30 to 55%, preferably about 35 to 50% or parts by weight, with the balance, i. e. 70–45, preferably 65–50, parts by weight of isobutylene; then, the amount of additional styrene to be injected in the second stage will be about 15 to 45, preferably about 20 to 35% or parts by weight, based on the total of 100 parts by weight of reactants.

The details and advantages of the invention will be better understood from the following experimental data:

A series of runs where made in which styrene and isobutylene were copolymerized in the general temperature range of −80 to −100° C., using as catalyst a solution of aluminum chloride dissolved in methyl chloride and using liquid ethylene as external refrigerant and using 2 to 5 volumes of methyl chloride as feed diluent, per volume of mixed isobutylene and styrene reactants. These runs were all carried out in an actual 3-stage continuous operation, or in laboratory equipment set up to simulate such 3-stage continuous operation, so that the effects were substantially the same. In these runs, a feed consisting of methyl chloride as diluent, and the hydrocarbon monomers, namely styrene and isobutylene, was fed to the first reactor; the effluent from the first reactor went to the second reactor, and the effluent from the second reactor went to the third reactor; and finally the effluent from the third reactor went to a recovery system where the catalyst is inactivated by addition of water or an alcohol, e. g. isopropyl alcohol, and then the methyl chloride diluent is flashed off, and the resulting copolymer is recovered in a dry form and subjected to various tests, including a chemical analysis by C and H determination and refractive index, as well as physical properties such as intrinsic viscosity (in toluene), Mooney viscosity, and Williams plasticity (at 60° C.).

Of the ten runs made, the first four, identified as runs A, B, C, and D, do not represent the present invention, but the last six marked Examples 1 to 6 inclusive do represent this invention.

Runs A, B and C represent substantially normal 3-stage operation, i. e. with no withholding of either monomer in the first stage, and no extra injection of either monomer in either of the later stages; whereas in run D, some styrene was withheld from the first stage and injected into the third stage.

In the runs marked Examples 1 to 6, representing the present invention, Examples 1 and 2 involve withholding some of the isobutylene in the first stage, and then injecting extra isobutylene in the second stage, thus having substantially the same effect as adding extra styrene in the first stage and withholding it from the second stage. In Examples 3 to 6, some styrene was withheld from the first stage, and injected as extra styrene in the second stage. This is the preferred method of operation. Example 6 was run on the same principle as Examples 3 to 5, but was made as an actual continuous 3-stage operation, whereas runs A to D and 1 to 5 simulated 3-stage continuous operation, but differed therefrom in that the effluent from stage 1 was analyzed, and a feed corresponding to the effluent except for the polymer was synthesized and fed to stage 2, rather than feeding the effluent from stage 1 to stage 2 directly. The feed for stage 3 was correspondingly prepared according to the analysis of the effluent from stage 2, omitting polymer.

In this series of tests, the Williams plasticity data were obtained according to the standard A. S. T. M. test D926–47T, the determinations being made at 60° C. (140° F.). The Mooney values were obtained on the standard Money viscometer according to the ASTM test D927–47T, the temperature used being 212° F.

The amount of catalyst to be used in the various stages of the polymerization, according to the present invention, will vary to some extent according to the reactant-diluent ratio, the relative purity of the reactants, and perhaps other minor factors, but chiefly will be purposely varied in order to obtain the desired amount of conversion in the several polymerization stages, as explained heretofore. In the particular series of tests described herebelow, the catalyst used was a solution of aluminum chloride in methyl chloride, having a concentration in the vicinity of about 0.2% by weight. The catalyst efficiency, calculated on the basis of the weight of polymer produced from the particular weight of catalyst used, is relatively higher in the early stages of polymerization while the monomer concentration is relatively high, i. e. before much of the monomer has been converted into polymer; in later stages the catalyst efficiency becomes considerably reduced. In the present series of tests, described herebelow, the catalyst efficiency, expressed in pounds of polymers per pound of catalyst used, was in the range of about 300 to 1000 in the first stage, about 100 to 500 in the second stage, and about 40 to 150 in the third stage. The overall catalyst efficiency was about 200; this means that about 0.5 lb. of catalyst, i. e. aluminum chloride, was used per 100 lbs. of polymer produced.

*Table I*

THREE-STAGE CONTINUOUS MANUFACTURE OF STYRENE-ISOBUTYLENE COPOLYMER CONTAINING 60% STYRENE AND 40% ISOBUTYLENE

[All runs are 25 wt. percent feed in diluent unless otherwise stated.]

| Run No. | Stage | Extra Styrene Injection | | | Percent/wt. in Composite | Percent Styrene | I. V. | Mooney | Williams Plasticity (at 60° C.) |
| --- | --- | --- | --- | --- | --- | --- | --- | --- | --- |
| | | Percent Styrene [1] | Stage | | | | | | |
| | | | Withheld | Injected | | | | | |
| A [2] | 1 | | | | 44.5 | 51.2 | 0.93 | 52 | 239 |
| | 2 | | | | 32.1 | 58.4 | 0.97 | 60 | 278 |
| | 3 | | | | 23.3 | 75.7 | 0.50 | 71 | 359 |
| | | | | | Composite | 58.5 | 0.88 | 59 | 310 |
| B | 1 | | | | 34 | 42.5 | 1.42 | | 251 |
| | 2 | | | | 33 | 60.0 | 1.08 | | 296 |
| | 3 | | | | 33 | 78.0 | 0.50 | | 401 |
| | | | | | Composite | 59.0 | 0.99 | | 361 |
| C | 1 | | | | 44 | 48.0 | 1.22 | | |
| | 2 | | | | 32.5 | 65.2 | 0.93 | | |
| | 3 | | | | 23.5 | 79.4 | 0.14 | | |
| | | | | | Composite | 61.8 | 0.89 | 56 | 330 |
| D | 1 | 13 | 1 | 3 | 45.4 | 39.4 | 1.04 | 49 | 212 |
| | 2 | | | | 36.9 | 62.7 | 0.77 | 66 | 301 |
| | 3 | | | | 17.7 | 89.0 | 0.35 | 175+ | 404 |
| | | | | | Composite | 60.0 | 0.77 | 66 | 324 |

[1] Based on total final polymer.
[2] 35% feed in diluent.

Table II
PRESENT INVENTION

| Ex. No. | Stage | Extra Styrene Percent Styrene[1] | Stage Withheld | Stage Injected | Conversion, Percent wt. in Composite | Percent Styrene | I. V. | Mooney | Williams Plasticity (at 60° C.) |
|---|---|---|---|---|---|---|---|---|---|
| 1 | 1 | 20 | 2 | 1 | 40.2 | 70.0 | 1.00 | 81 | 343 |
|   | 2 |    |   |   | 39.4 | 43.7 | 0.95 | 52 | 217 |
|   | 3 |    |   |   | 20.4 | 71.5 | 0.23 | 175+ | 342 |
|   |   |    |   |   | Composite | 60.8 | 0.78 | 58 | 356 |
| 2 | 1 | 25 | 2 | 1 | 43.5 | 79.0 |      | 119 | 397 |
|   | 2 |    |   |   | 31.5 | 34.3 |      | 53 | 194 |
|   | 3 |    |   |   | 25.0 | 59.1 |      | 38 | 195 |
|   |   |    |   |   | Composite | 60.5 | 0.78 | 60 | 386 |
| 3 | 1 | 15 | 1 | 2 | 42.1 | 40.5 | 1.22 | 63 | 240 |
|   | 2 |    |   |   | 36.9 | 73.3 | 0.80 | 87 | 355 |
|   | 3 |    |   |   | 21.0 | 75.7 | 0.30 | 60 | 394 |
|   |   |    |   |   | Composite | 60.9 | 82 | 57 | 349 |
| 4 | 1 | 24.5 | 1 | 2 | 45.0 | 36.1 | 0.96 | 51 | 206 |
|   | 2 |    |   |   | 29.1 | 78.2 |      | 113 | 395 |
|   | 3 |    |   |   | 25.9 | 80.9 |      | 175+ | 401 |
|   |   |    |   |   | Composite | 59.6 |      | 69 | 412 |
| 5 | 1 | 33 | 1 | 2 | 36.7 | 24.9 | 1.23 | 65 | 187 |
|   | 2 |    |   |   | 35.7 | 77.1 | 0.92 | 175+ | 401 |
|   | 3 |    |   |   | 27.6 | 84.2 | 0.44 | 175 | 405 |
|   |   |    |   |   | Composite | 60.5 | 0.88 | 83 | 408 |
| 6[2] |  |  25 | 1 | 2 | Final Product | 59 |  | 85 | 392 |

[1] Based on total final polymer.
[2] Actual 3-stage continuous run.

The above data show that with normal three-stage operation, as in runs A, B and C, when making a styrene-isobutylene copolymer averaging about 60% combined styrene, the composite product will have a Williams plasticity (at 60° C.) of about 310–360. Run B, which gave the best results, was arranged to yield a polymer of somewhat higher I. V. (intrinsic viscosity) than the other runs by splitting the conversion equally among the stages. Heat transfer and viscosity considerations would favor the 45–35–20 distribution of conversion among the stages. Run D shows that if about 13% styrene based on total final polymer is withheld from the first stage and injected into the third stage, no substantial increase in Williams plasticity is obtained.

On the other hand, by operating according to the present invention, Examples 1 and 2, in which 20 and 25% styrene based on total final polymer was in effect added extra in the first stage (by withholding some of the isobutylene from the first stage and adding it to the second stage), show that a substantial improvement in Williams plasticity is obtained, particularly in Example 2 where the Williams plasticity was raised to 386. Even Example 1 represents an improvement over the corresponding normal three-stage operation of the same conversion, distribution and I. V. Examples 3, 4 and 5 show that when 15%, 24.5% and 33% respectively of styrene based on total final polymer is withheld from the first stage and injected into the second stage, according to the preferred modification of the invention, the resulting Williams plasticity figures are respectively, 349, 412, and 408. Also, Example 6 shows that in an actual three-stage continuous run, the withholding of 25% of styrene based on total final polymer from stage 1 and injection into stage 2 resulted in a product having a Williams plasticity of 392 with an 85 Mooney.

Thus, it is apparent that best results are obtained when 20 to 35% of styrene based on total final polymer is withheld from either the first or second stages and injected extra into the other one of these first two stages. All of the tests made under these conditions, namely Examples 2, 4, 5 and 6, gave products having a Williams plasticity above 375, which is the desired minimum.

Thus, it is noted that the present invention obtains a very unexpected improvement in product quality by making purposely a more heterogeneous polymer, and the invention shows that in general to obtain improved Williams plasticity characteristics, non-homogeneous polymers are desired. This is quite contrary to the general teachings of the prior art.

Thus, for instance, in Table I, it is seen that the arithmetic difference between the percent of styrene in the fraction having the lowest average percent styrene and the styrene content of the fraction having the next higher styrene content, ranges from 7.2 (58.4–51.2) in run A, to 23.3 (62.7–39.4) in run D. On the other hand, in Table II, representing the present invention, the corresponding differences in percent of styrene range from 26.3 (70.0–43.7) in Example 1 up to 52.2 (77.1–24.9) in Example 5. This indicates a much greater heterogeneity in the polymer compositions of the present invention in which there is a difference of at least 25, and preferably a difference of 30 to 55, percent styrene between the fraction having the lowest average styrene content and the fraction having the next higher average styrene content. It is understood of course, that each of these fractions, in its own compositional distribution, contains the highest proportion by weight of molecules having that particular average styrene content, and contains successively lesser amounts of molecules having a styrene content below or above that average percent styrene. It is therefore important, according to the present invention, that there be very substantial gaps in the compositional distribution of the polymer molecules in the composite composition. It is particularly important to have a large gap or difference between the average styrene content of the copolymer fraction made in the stage having the lowest average styrene content, and the average styrene content of the stage making the copolymer of the next higher average styrene content. Thus, there should preferably be a difference of at least 25%, or preferably 30 to 55% between the average styrene content of the polymer made in the first stage and that made in the second stage.

EXAMPLE 7

A large scale continuous three-stage polymerization, analogous to commercial operation, of styrene and isobutylene was carried out to make a copolymer having an average styrene content of 50%. Methyl chloride was the diluent, and the total reactants used amounted to 15% by weight. The catalyst and temperature used were substantially the same as in Example 6. In the several stages, cumulative conversion was 50% in the first stage, 80% at the end of the second stage, and 100% at the end of the third stage. Some of the styrene feed was withheld from the first stage and injected into the second stage, the proportion fed into the first stage being actually 43% by weight. The styrene withheld from the first stage was added to the second stage. The resulting product had a Mooney value of 60±5, and the Williams plasticity value ranged from 350 to 400, which is surprisingly high for a copolymer having an overall average of 50% combined styrene. Slight variation in the proportion of styrene fed in the first stage, indicated that instead of the 43% styrene, good results could be obtained in general with a styrene feed ranging from 41 to 45% in order to have a finished copolymer product having a Williams plasticity value in the desired range for proper processing characteristics.

EXAMPLE 8

A styrene-isobutylene copolymer having an average combined styrene content of 60% was made in a continuous two-stage operation, using a 15% by weight polymerizable hydrocarbon feed in methyl chloride diluent, and conditions otherwise substantially as in Example 6. In this case, a styrene feed of 50% by weight was used in the first stage, meaning that 20% of styrene based on total final polymer was withheld from the first, and injected into the second or last stage. In other words, to make a final product containing 60% of styrene, the feed used in the first stage contained 40 parts by weight of isobutylene and 40 parts by weight of styrene, and the 20 parts by weight of styrene which were thus withheld from the first stage, were added in the last stage. Therefore, on a percentage basis, the 50% styrene feed used in the first stage represented 83⅓% of the desired final average of 60%. The actual conversion was 50% in the first stage, which produced a polymer of about 43 percent styrene content, and 100% at the end of the second stage. Therefore the 20 parts by weight of styrene added extra in the second stage resulted in a styrene feed in the second stage of about 125–130% of the desired final average of 60%.

The final copolymer product had a Mooney value of 60±5, and a Williams plasticity ranging from 375 to 400. Thus the Williams plasticity obtained was better than obtained in any of the runs A, B and C, in which no monomer was withheld, and also better than the 324 obtained in run D in which styrene was withheld from the first stage and injected into the third stage, and also better than the 356 and 349 obtained in Examples 1 and 3, and about as good as the 386 and 392 obtained in Examples 2 and 6, and almost as good as 412 and 408 obtained in Examples 4 and 5, in all of which seven experiments a 3-stage polymerization was used. Thus the present invention has the great advantage of getting substantially as good results with only two reactors instead of three, whereby a considerable savings is effected in expensive equipment, as well as attendant other factors such as plant size, simplicity of design and operation, etc.

EXAMPLES 9, 10 AND 11

The following data are given to show the application of invention to the manufacture of a styrene-isobutylene copolymer of 50% combined styrene in a two-stage continuous polymerization process in which some of the styrene is withheld from the first stage and injected into the second stage.

These runs were carried out by polymerization at about −80 to −100° C., using as catalyst a solution of aluminum chloride in methyl chloride, as in the above-described experiments, and using a feed mixture containing about 15% by weight of reactants in methyl chloride diluent. The polymerization was carried out in two large scale commercial reactors, each equipped with high speed stirring, and jacketed with liquid ethylene coolers, the overflow from the first reactor being fed directly into the second reactor. The catalyst feed to each reactor was controlled to obtain a desired amount of conversion in the first stage, and substantially complete conversion in the second stage. The following Table III shows the percent by weight of styrene in the feed to the first stage, the amount of conversion in the first stage, the amount of styrene withheld from the first stage and injected into the second stage, and tabulates the product evaluation in regard to the percent of styrene combined with the final product, and the Mooney and Williams plasticity value of the final product.

Table III

MANUFACTURE OF COPOLYMER OF 50% COMBINED STYRENE

| Example | 9 | 10 | 11 |
|---|---|---|---|
| Percent Styrene in First Stage Feed: | | | |
| Percent/wt. in Feed | 40 | 43 | 45 |
| Percent of Final Average | } 80 | 86 | 94 |
| Percent Combined Styrene | | | |
| Percent Conversion: | | | |
| First Stage | 70–75 | 65–70 | 80 |
| Second Stage | 30–25 | 35–30 | 20 |
| Percent Styrene Withheld in First Stage and Injected in Second Stage (Based on Total Polymer) | 16.7 | 12.3 | 5.0 |

FINAL PRODUCT EVALUATION

| | | | |
|---|---|---|---|
| Percent Combined Styrene | 50 | 50 | 48 |
| Mooney | 70 | 60 | 54 |
| Williams Plasticity | 390 | 360 | 350 |

A satisfactorily high Williams plasticity value was obtained in each of the three examples, the best results being obtained in Example 9 in which the first stage feed contained only 40% by weight of styrene, which amounted to only 80% of the desired final average of 50% combined styrene in the final polymer. In this case the amount of styrene withheld from the first stage and injected into the second stage was 16.7% based on total polymer. However, even smaller amounts of withholding such as 12.3% in Example 10 and the 5% in Example 11 gave final polymer compositions having a Williams plasticity value of 350 or higher.

These three examples thus give substantially as good Williams plasticity values as were obtained in two corresponding 3-stage runs in which some styrene was withheld from the first step and injected into the second step, producing Williams plasticity values of 359 and 383. It is also remarkable that the values of 350 to 390 obtained in Examples 9, 10 and 11 are outstandingly superior to the value of 271 obtained in a 3-stage continuous polymerization without any withholding of styrene.

Thus, in carrying out the present invention, it is generally desirable to effect a conversion of about 50 to 85%, preferably about 60 to 80%, of monomers into polymer, in the first stage, and then obtain complete conversion in the second, i. e. last, stage, namely, 50 to 15%, or preferably 40 to 20%, to make a total cumulative conversion of at least 98 to 100%. Also, it is generally desirable to use a first-stage feed in which the percent of styrene or equivalent cyclic compound is about 65 to 95% of the desired final average percent of combined cyclic compound, and this should preferably be about 75 to 90%. This is effected by withholding from the first stage about 5 to 20% of the styrene, based on total polymer, and injecting it into the second stage, thereby making in the second stage a copolymer fraction in which the percent of combined styrene is about 250–105, preferably 160–110, percent of the desired final percent of combined styrene. The final composition is therefore essentially a mixture of two separate fractions as thus described, and contains not more than a minor proportion of copolymer molecules having the same amount of combined styrene as in the average of the entire composition.

It is not intended that the invention be limited to the specific modifications which have been given above for the sake of illustration, but only by the appended claims in which it is intended to claim all novelty inherent in the invention and all modifications coming within the scope and spirit of the invention.

What is claimed is:

1. In a process of copolymerizing a lower aliphatic mono-olefin with a polymerizable mono-olefinic compound containing a cyclic nucleus, at a temperature of about 10° F. to −160° F., in the presence of a Friedel-Crafts catalyst, continuously in two stages, the improvement comprising producing in one but only one stage a copolymer having 65–95% of the desired final average percent of combined cyclic constituents, and in the other stage making a copolymer having 250 to 105% of the desired final average percent of combined cyclic constituents.

2. In a substantially continuous two-stage copolymerization of an alkene of 3 to 5 carbon atoms, with a polymerizable aromatic compound selected from the group consisting of styrene and methyl and halogen-substituted styrenes, at a temperature of +10° F. to −160° F. with 1 to 10 volumes of inert diluent per volume of reactants in the feed, and in the presence of a Friedel-Crafts catalyst, the improvement comprising producing in the first stage a copolymer having 65–95% of the desired final average percent of combined aromatic constituent, and in the second stage making a copolymer having 250 to 105% of the desired final average percent of combined aromatic constituent.

3. In a substantially continuous two-stage copolymerization of styrene and isobutylene at a temperature of about −100° F. to −140° F., with about 1 to 10 volumes of methyl chloride per volume of reactants in the feed and in the presence of a Friedel-Crafts catalyst, using proportions of reactants to produce copolymers having an average combined styrene content of about 40 to 70% by weight, and using catalyst additions in the two stages so as to obtain a 50 to 85% conversion of monomers to polymer in the first stage, and making an additional conversion of 50 to 15% in the last stage in order to make a total conversion of 95 to 100% in the last stage, the improvement comprising making in the first stage a copolymer having about 65–95% of the desired final average percent of combined styrene, and in the other stage making a copolymer having about 220 to 105% of the desired final average percent of combined styrene.

4. In a continuous two-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having an average combined styrene content of about 48 to 62% by weight, and using catalyst additions in the two stages to effect about 60 to 85% conversion of monomers to polymer in the first stage, and an additional conversion of 40 to 15% in the other stage, thus making a total conversion of 98 to 100%, the improvement comprising making in the first stage a copolymer having about 75 to 90% of the desired final average percent of combined styrene, and in last stage making a copolymer having 180 to 110% of the desired final average percent of combined styrene.

5. In a continuous two-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having an average combined styrene content of about 58 to 62% by weight, and using catalyst additions in the two stages to effect about 60 to 85% conversion of monomers to polymer in the first stage, and an additional conversion of 40 to 15% in the second stage, thus making a total conversion of 98 to 100%, the improvement comprising making a copolymer having a combined styrene content of about 45 to 55% in the first stage, and about 90 to 65% in the second stage.

6. In a continuous two-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having a combined styrene content of about 48 to 52% by weight, the improvement comprising withholding about 5 to 20% of styrene from the first stage, based on the total final polymer, and injecting that same corresponding amount of styrene in the second stage, whereby a resultant copolymer is produced having a combined styrene content of about 30 to 45% in the first stage, and about 90 to 55% in the second stage, and whereby the final composite copolymer composition has an average combined styrene content of about 48 to 52%, and a Williams plasticity at 60° C. of at least 350.

7. Product consisting essentially of two fractions of high molecular weight copolymers of a lower aliphatic mono-olefin with a polymerizable mono-olefinic compound containing a cyclic nucleus, one of said copolymer fractions having an average percent of combined cyclic constituent amounting to about 65 to 95% of the average percent of combined cyclic constituent in the entire copolymer composition, and the other copolymer fraction in said composition having an average percent of combined cyclic constituent amounting to 220 to 105% of the final average percent of combined cyclic constituent, there being present in the over-all composition only a minor proportion of copolymer molecules having the same amount of combined cyclic constituent as in the average of the entire composition.

8. Product consisting essentially of two fractions of styrene-isobutylene copolymers having an average combined styrene content of about 58 to 62% and having an average Williams plasticity of at least 375, one of said fractions having a combined styrene content of about 45 to 55, and the other one about 90 to 65%, this last being the component of lowest molecular weight.

9. Product consisting essentially of two different fractions of styrene-isobutylene copolymers having an average combined styrene content of about 48 to 62% and having a Williams plasticity at 60° C. of at least 350, and an average Mooney at 212° F. of about 50 to 90, fraction A constituting about 60 to 85% by weight of the entire mixture and having a combined styrene content of about 75 to 95% of the desired final average percent of combined styrene, fraction B constituting about 40 to 15% of the entire mixture, and having about 180 to 110% of the desired final average percent of combined styrene, this last being the component of lowest molecular weight, and there being present in the over-all composition not more than a minor proportion of copolymer molecules having the same amount of combined styrene as in the average of the entire composition.

10. Product consisting essentially of two fractions of styrene-isobutylene copolymers having an average combined styrene content of about 48 to 52% by weight and having an average Williams plasticity of at least 350, one of said fractions having a combined styrene content of about 30 to 45%, and the other one about 90 to 55%, this last being the component of lowest molecular weight.

References Cited in the file of this patent

UNITED STATES PATENTS 2,666,046   Nelson _____ Jan. 12, 1954